D. P. BOWER.
Bee-Hive.
No. 220,747. Patented Oct. 21, 1879.
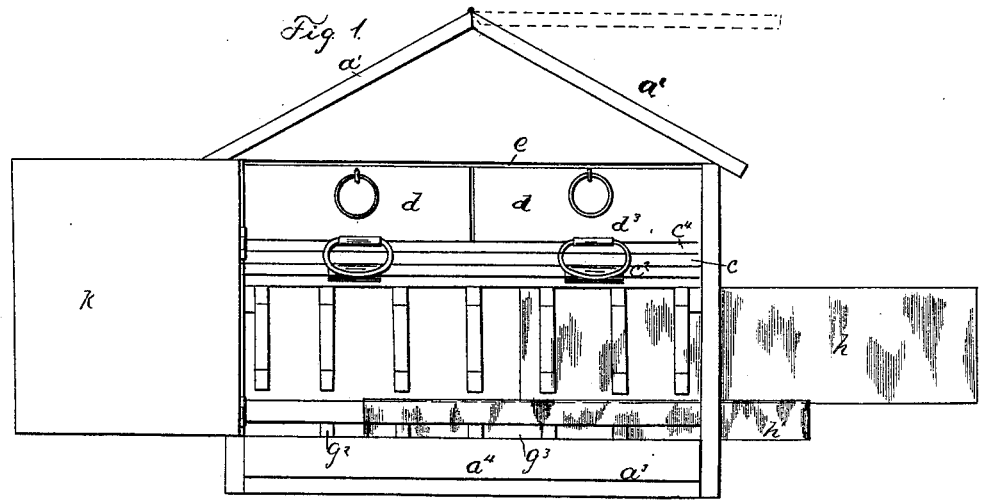
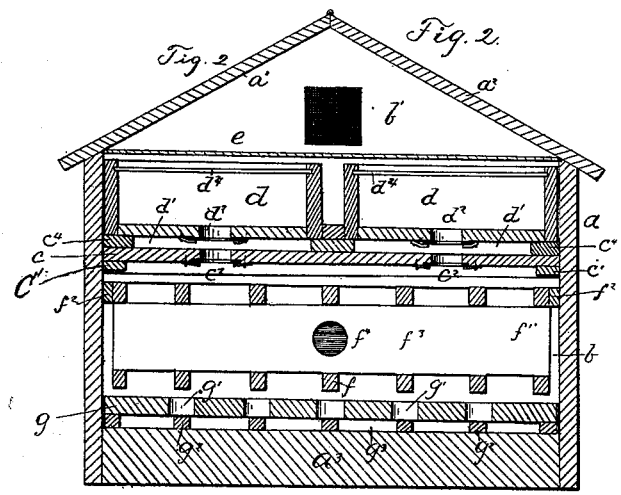
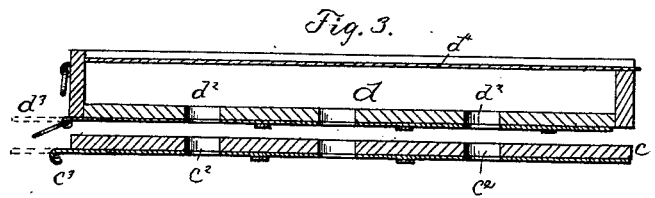
WITNESSES
J. B. Holderby
F. D. Thomason
INVENTOR
Delorem P. Bower
By R. S. & A. P. Lacey ATTORNEYS.

UNITED STATES PATENT OFFICE.

DELOREM P. BOWER, OF LEON, ASSIGNOR OF ONE-HALF OF HIS RIGHT TO CHARLES E. FLANDERS, OF DECATUR, IOWA.

IMPROVEMENT IN BEE-HIVES.

Specification forming part of Letters Patent No. 220,747, dated October 21, 1879; application filed July 3, 1879.

*To all whom it may concern:*

Be it known that I, DELOREM P. BOWER of Leon, in the county of Decatur and State of Iowa, have invented certain new and useful Improvements in Bee-Hives; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

This invention has for its object to furnish a moth-proof hive, and one in which the bees can be easily examined and handled; and it consists in the construction and arrangement of the several parts hereinafter described, and pointed out in the claims.

In the drawings, Figure 1 is a front elevation with the doors opened. Fig. 2 is a vertical cross-section, and Fig. 3 is a detail view.

$a$ is the box or casing, made with a gable top, one side, $a^1$, of which is fixed rigidly in place, while the other side, $a^2$, is hinged to the edge of the side $a^1$, so that it can be raised, as indicated in Fig. 1, for the purpose of inspecting the bees, or for any other purpose desired.

The box is divided into chambers $b\ b'$—lower and upper—by a removable partition, $c$, which slides into and out of the box on the side cleats, $c^1\ c^1$. The partition $c$ is perforated by a series of passage-ways, $c^2$, through which the bees pass from one chamber to the other, and which are closed by slide-valves $c^3$, which may be operated from the front of the box. Immediately above the partition $c$, I arrange a fixed frame, $c^4$, which supports the honey-drawers $d\ d$ in such position as to provide intervening spaces or air-chambers, $d^1$, between said partition and boxes, and an intervening air-chamber, $d^1$, in the center of the box between the sides of the honey boxes or drawers $d\ d$. Each of the drawers $d$ is perforated with passages $d^2$, closed by slide-valves $d^3$, and corresponding in number and coincident with the passages $c^2$ in the partition $c$, and each is provided with a sliding glass top or lid, $d^4$.

Immediately above the drawers $d$, and sliding in suitable channels formed in the side of the box $a$, I place a removable glass plate, $e$, which divides the upper chamber, $b'$, into two parts, the under side of which contains the drawers $d$, and the upper portion, under the roof $a^1\ a^2$, being reserved as an air-chamber, and to give facilities for inspecting and handling the bees. The plate $e$ also serves as a substantial protection against the entry of moths from above.

In the lower chamber of the box $a$, I place the series of comb-frames $f$. These frames are all united together, so as to form a comb-rack, $f^1$, which slides on cleats $f^2$ in and out of the box $a$. The rear ends of the comb-frames $f$ are fixed to the upper and under edges of a strip, $f^3$, having a depth equal to the width between the upper and under bars of the frames $f$. This strip is provided with a ventilator, $f^4$, which coincides with a ventilator in the back end of the box $a$, and when the comb-rack is in place it fits snugly against the rear wall or end of the box. I employ this strip to prevent the bees from attaching the comb to the end of the box. A comb-rack, $f^1$, constructed as described, can be readily removed from the box, when desired, without injury to any of the comb in the several frames $f$.

In the bottom of the lower chamber, $b$, I place a false bottom, $g$, which is perforated by a series of passages, $g^1$, which are arranged in a series of longitudinal rows, corresponding in number with the number of the comb-frames $f$. These rows of passages $g^1$ are also arranged to be immediately below and slightly removed from the edges of the under bars of the comb-frame $f$, as shown in Fig. 2. The false bottom $g$ is supported on a series of longitudinal strips or bars, $g^2$, which rest on the bottom $a^3$ of the box $a$.

The strips $g^2$ correspond in number with the number of longitudinal rows of passages $g^1$, and they are arranged and fastened to the bottom $g$ so as to cross the several holes $g^1$ diametrically, and leave on each side a passage wide enough to permit the bees to pass upward into the main hive-chamber.

The object of arranging the frames $f$ and cleats $g^2$ as described is to give a narrow entrance, which the bees can easily protect, and also to afford easy steps or means by which the bees can climb into the hive. The bee first climbs onto the top of the strips $g^2$, and thence onto the top of the bottom $g$.

The strips $g^2$ also form long narrow passage-ways $g^3$ between, leading from the alighting-board into the hive. The passages $g^3$ and the narrowness of the passages leading into the hive through the holes $g^1$ give to the bees the power to perfectly protect themselves against the entrance of bees from below.

The false bottom $g$ is projected slightly beyond the front end of the comb-rack $f^1$, so as to provide facilities for catching hold of it, and also to form an under rest or bearing for the under edge of a sliding glass front, $h$, which may be slipped laterally through a slot in the side of the box. The slide $h$ closes the front end of the main honey-chamber.

The passage-ways $g^3$ may be entirely closed by a glass slide, $h'$, inserted from the side, as shown in Fig. 1.

The bottom $a^3$ is projected, so as to provide an inclined alighting-board, $a^4$, as shown.

The entire working of the bees can be inspected in this hive.

The lids of the drawers $d$ and the glass plate $e$ may be removed, and the bees can be driven into the upper chamber when it is desired to make any changes in the under chamber, $b$.

The entire series of frames forming the comb-rack $f^1$ are removed at once, and any portion of the comb may be removed and the other portion returned to the hive.

If the glass plate $e$ be slightly moved outward, a small opening will be made between its rear end and the end of the box. This will afford perfect ventilation.

The lid $a^2$ may be raised and left opened, when desired.

The front end of the box is closed by two doors, $k$, one of which is removed to better show the outer parts of the hive.

What I claim as my invention is—

1. In a bee-hive, the false bottom $g$, constructed with a series of rows of passages, $g^1$, and supported on a series of strips, $g^2$, affixed to its under side, and crossing the passages $g$ diametrically, so as to provide narrow openings or passages on each side, and also form narrow entries $g^3$, substantially as and for the purpose set forth.

2. In a bee-hive provided with a bottom, $g$, constructed with a series of rows of passages, $g^1$, supported on strips $g^2$, affixed to its under side, and crossing the passages $g$ diametrically, as described, the removable comb-rack $f^1$, composed of a series of frames, $f$, which are arranged immediately over and so as to cross the holes or passages $g^1$ diametrically, substantially as and for the purposes set forth.

In testimony that I claim the foregoing as my own I affix my signature in presence of two witnesses.

DELOREM P. BOWER.

Witnesses:
   L. S. PERDEWO,
   JAMES LITTLE.